United States Patent
Speicher et al.

(10) Patent No.: US 6,370,462 B1
(45) Date of Patent: Apr. 9, 2002

(54) ACCELERATION CONTROL FOR A VEHICLE WITH CVT

(75) Inventors: Patrick Speicher, Oberteuringen; Wolfgang Danz, Friedrichshafen; Andreas Piepenbrink, Meersburg, all of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/650,615

(22) Filed: Aug. 30, 2000

(30) Foreign Application Priority Data

Sep. 10, 1999 (DE) .......................... 199 43 332

(51) Int. Cl.$^7$ ................................. G06F 7/00
(52) U.S. Cl. ................. 701/51; 701/60; 477/37
(58) Field of Search .................. 701/51, 54, 61; 477/39, 43, 37, 45, 46, 44, 34; 475/211, 214, 216, 253; 474/28, 18, 2, 70, 46

(56) References Cited

U.S. PATENT DOCUMENTS

| | | | |
|---|---|---|---|
| 4,704,683 A | * 11/1987 | Osanai | 701/51 |
| 5,655,991 A | * 8/1997 | Lardy et al. | 477/46 |
| 5,690,576 A | * 11/1997 | Moroto et al. | 475/211 |
| 6,106,420 A | * 8/2000 | Ketelaars et al. | 474/2 |
| 6,169,950 B1 | * 1/2001 | Parigger | 701/53 |
| 6,210,298 B1 | * 4/2001 | Baur et al. | 475/211 |
| 6,216,075 B1 | * 4/2001 | Speicher et al. | 701/51 |
| 6,219,607 B1 | * 4/2001 | Piepenbrink et al. | 701/51 |
| 6,224,509 B1 | * 5/2001 | Gierling | 477/45 |

FOREIGN PATENT DOCUMENTS

| | | |
|---|---|---|
| DE | 195 27 412 A1 | 1/1997 |
| DE | 196 06 311 A1 | 8/1997 |
| DE | 196 31 070 A1 | 2/1998 |

* cited by examiner

Primary Examiner—Jacques Louis-Jacques
(74) Attorney, Agent, or Firm—Davis & Bujold, P.L.L.C.

(57) ABSTRACT

Within the scope of the process for control of vehicle acceleration for a motor vehicle having a continuously variable transmission, the vehicle acceleration is controlled by the ratio adjustment in the continuously variable automatic transmission with a pattern-based control addition using a status assessment method for assessing the output torque.

6 Claims, 2 Drawing Sheets

ACCELERATION CONTROL FOR A VEHICLE WITH CVT

The invention concerns a process to control vehicle acceleration for a motor vehicle having a continuously variable automatic transmission.

BACKGROUND OF THE INVENTION

According to the belt-drive principle, a continuously variable automatic transmission (CVT transmission) is usually comprised, of a starting unit, a forward/reverse drive unit, an intermediate shaft, a differential, hydraulic and electronic control devices and a variator, among others. The variator usually comprises a primary and a secondary pulley, both pulleys formed of beveled pulleys disposed in pairs, and is provided with a torque-transmitting, belt-drive element which rotates between both beveled pulley pairs. In a transmission of that kind the actual ratio is defined by the running radius of the belt-drive element which, in turn, is a function of the axial position of the beveled pulleys.

Consequently, subject to construction, during a change of ratio the beveled pulley pairs of the primary and secondary pulleys of the variator are alternately and complementally to each other, pushed apart and pushed together, which produces a change of the running radius of the belt-drive element on the beveled pulleys and thus a change of ratio between primary and secondary sides.

According to the prior art and depending on the existing design and under circumstances a downshift produces a deceleration of the vehicle while an upshift produces a corresponding acceleration, but the effects are not always desirable.

Based on the prior art, this invention is based on the problem of outlining a process for controlling acceleration of a vehicle having a continuously variable automatic transmission, to prevent an undesired deceleration or acceleration of the vehicle during the shifting operation, and make the acceleration curve adjustable per unit time.

In addition, the driver's comfort must be increased and the drive train oscillations reduced.

SUMMARY OF THE INVENTION

It is, therefore, proposed to control vehicle acceleration by adjusting the ratio of the continuously variable automatic transmission by addition of a model-based control which uses a status estimating method to assess the output torque.

According to the invention, within the scope of the control, the tractional resistance torque is assessed by means of an interference level observation. A drive train pattern is used for this.

The tractional resistance torque is delivered as a variable pattern by interference level observation, whereby a very precise relationship is created and maintained between vehicle acceleration and ratio gradient.

Consequently, driving strategy possibilities result, defining the concept of spontaneity and, e.g. making downshifts applicable. By the proposed vehicle acceleration control, via ratio adjustment, it is possible to implement sporting, instantaneous downshifts and upshifts.

BRIEF DESCRIPTION OF THE DRAWINGS

The invention is explained in detail herebelow with reference to the enclosed drawings wherein.

DESCRIPTION OF THE EMBODIMENTS

Figure 1:
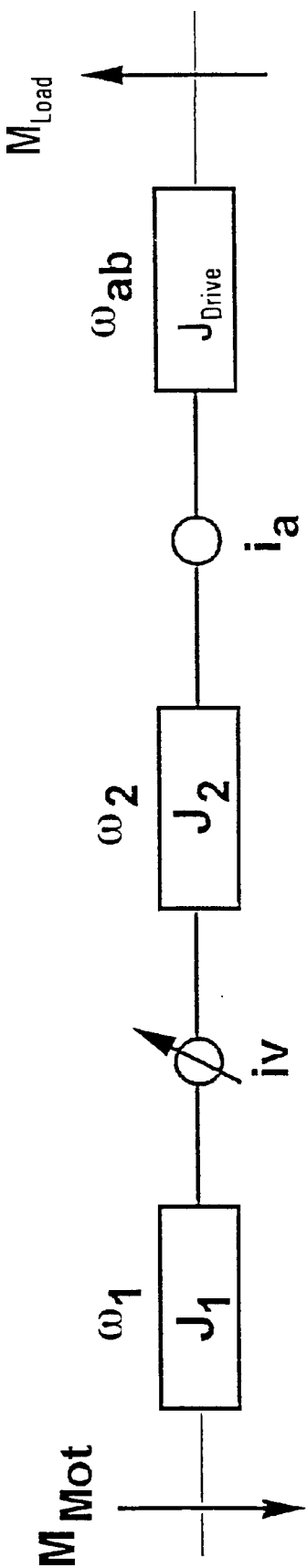
FIG. 1 shows a simplified block circuit diagram of the drive train pattern used.

FIG. 1 shows a one-axle model drive train consisting of three shafts combined to form concentrated inertiae. The shafts are the input shaft with angular speed $\omega_1$ and inertia $J_1$, the secondary shaft with angular speed ($\omega_2$ and Inertia $J_2$ and the output shaft with angular speed $\omega_{ab}$ and inertia $J_{Drive}$ (results from output and tires). The engine torque $M_{Mot}$, the variator ratio iv and the angular speed $\omega_2$ of the secondary shaft are the measured variables. For the status assessment method used, the indication of rotational speed and torque suffice to form the input variables of the method.

Within the scope of the status assessment method, the ratio gradient $$\frac{div}{dt},$$

depending on the vehicle acceleration, is calculated as follows from the equation for output shaft:

$$\omega_2 \cdot \left(J_1 \cdot iv^2 \cdot \eta + J_2 + \frac{J_{Drive}}{i_a^2 \cdot \eta_2}\right) = M_{Mot} \cdot iv \cdot \eta - \frac{M_{Load}}{i_a \cdot \eta_2} - J_1 \cdot iv \cdot \frac{div}{dt} \cdot \omega_2 \cdot \eta;$$

after solving for the ratio gradient:

$$\frac{div}{dt} = \frac{M_{Mot} \cdot iv \cdot \eta - \frac{M_{Load}}{i_a \cdot \eta_2} - \left(J_1 \cdot iv^2 \cdot \eta + J_2 + \frac{J_{Drive}}{i_a^2 \cdot \eta_2}\right) \cdot \omega_2}{J_1 \cdot iv \cdot \omega_2 \cdot \eta}$$

with the variables:

| | |
|---|---|
| $M_{Mot}$: | input torque |
| $M_{Load}$: | assessed output or tractional resistance torque |
| $\omega_1$: | angular speed of the secondary rotational speed |
| iv: | ratio of the variator |
| $J_1, J_2, J_{Drive}$: | inertiae |
| $i_a$: | axle ratio (constant) |
| $\eta$: | effectiveness input |
| $\eta_2$: | effectiveness output |

The equation forms the inverse pattern of the drive train pattern.

With the introduction of the correlation for the set vehicle acceleration:

$$a_{Fzg} = \frac{\omega_2}{i_a} \cdot r_{dyn} \text{ with } r_{dyn} \text{ as effective tire radius.}$$

The equation for the output shaft is described by the following relationship:

$$\frac{div}{dt} = \frac{M_{Mot} \cdot iv \cdot \eta - \frac{M_{Load}}{i_a \cdot \eta_2} - \left(J_1 \cdot iv^2 \cdot \eta + J_2 + \frac{J_{Drive}}{i_a^2 \cdot \eta_2}\right) \cdot \frac{a_{Fzg} \cdot i_a}{r_{dyn}}}{J_1 \cdot iv \cdot \omega_2 \cdot \eta}$$

A change of ratio adjustable via a regulator depends directly on the desired vehicle acceleration $\alpha_{Fzg}$ and can thus be used directly for the ratio regulator. By controlling to $$\frac{div}{dt}$$

the curve of the ratio iv follows after integration.

From the relationship between vehicle acceleration and ratio, criteria for sportiveness and spontaneity can be deduced and converted in the form of a set value standard $\alpha_{Fzg}$.

At the same time the driving strategy can maintain its set value for the ratio (e.g. curve of a rectangular function). The engagement results by means of the control according to the situation.

Knowing the tractional resistance torque $M_{Drive}$ via an interference level observation or a Kalman filter remains a condition.

Therefrom result two control strategies for a control via the ratio gradient $$\frac{div}{dt}:$$

1. The standard of vehicle acceleration and control via the ratio gradient, or alternatively
2. The standard of tractional resistance torque $M_{Load}$ and control via the ratio gradient:

According to the invention, the first choice or standard for vehicle acceleration is selected. Assessment of the tractional resistance torque $M_{Load}$ is implemented via the equation for the output shaft:

$$\omega_2 \cdot \left(J_1 \cdot iv^2 \cdot \eta + J_2 + \frac{J_{Drive}}{i_a^2 \cdot \eta_2}\right) = M_{Mot} \cdot iv \cdot \eta - \frac{M_{Load}}{i_a \cdot \eta_2} - J_1 \cdot iv \cdot \frac{div}{dt} \cdot \omega_2 \cdot \eta;$$

It is observed here with $M_{Load}$ as the interference level, that the equation $M_{Load}=0$. The ratio iv and the ratio gradient div/dt are included here as (time variant) parameters. The angular speed $\omega_2$ of the secondary shaft of the variator is the measured output variable. The engine torque $M_{Mot}$ is the input variable.

In the simplest case the limitation during downshifts can, for instance be based on the standard $\alpha_{Fzg} \geq 0$. According to the invention the vehicle acceleration is filtered via a low-pass filter in a manner such that only the fundamental oscillations of the vehicle acceleration appear in the signal (the high-frequency acceleration parts are not component parts of the set point value and also are not contained in the simplified equations of the drive train). Feedbacks from the control circuit are, thereby, prevented which would result in an unstable, uncomfortable behavior to the driver.

Figure 2:
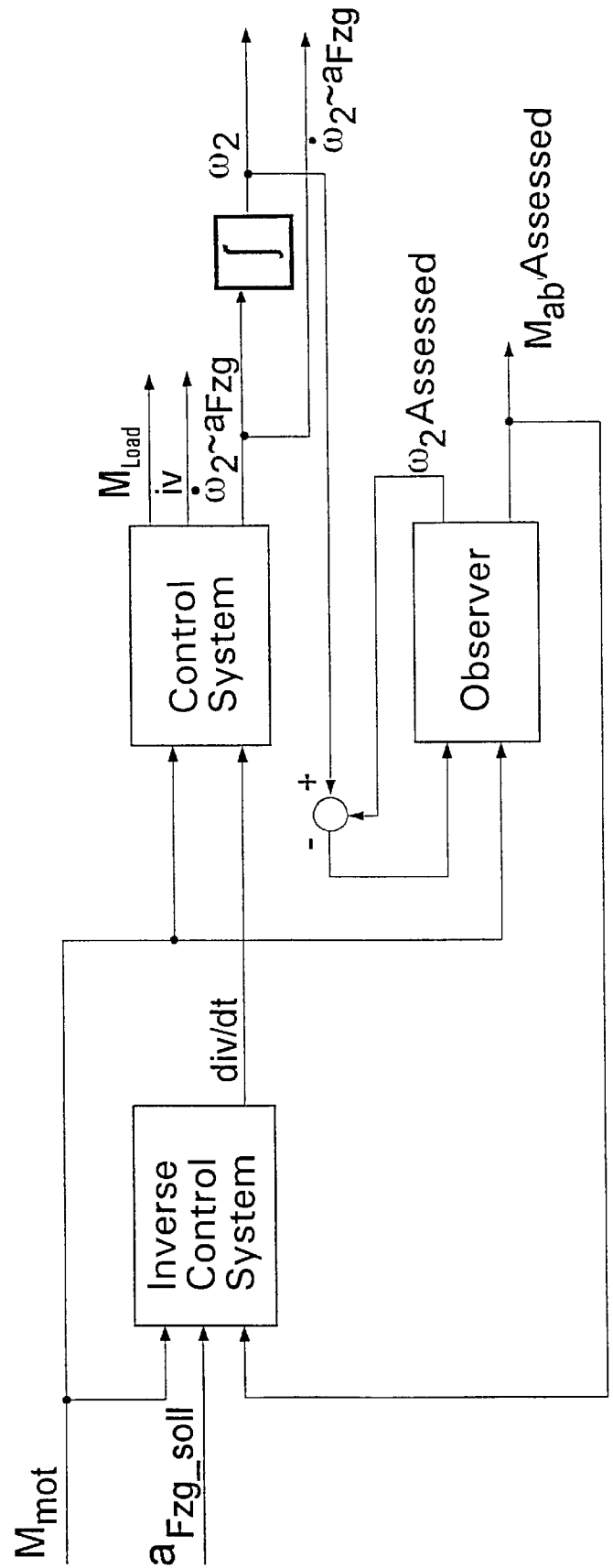
FIG. 2 shows a block circuit diagram of the control circuit structure according to this invention.

According to FIG. 2, within the scope of control of the vehicle acceleration, the tractional resistance torque $M_{Load}$ is assessed by means of an interference level observer and passed on to the inverse control system. The control circuit consists of the control system, the inverse control system (physical-mathematical pattern) and the interference level observer, with the engine torque $M_{Mot}$ as the input variable, and rotational speed of the secondary pulley as the output or control variable. The command variable to the control circuit is the vehicle acceleration $\alpha_{Fzgsoll}$; the correcting variable is the ratio gradient div/dt.

What is claim is:

1. A process for controlling acceleration of a motor vehicle having a drive train including an engine coupled to an input shaft which is connected with a primary pulley of a continuously variable automatic transmission, the primary pulley supplying adjustable driving power to a secondary pulley which is connected to an output shaft, the process comprising the steps of:
   measuring an input torque by the engine to the input shaft;
   determining an output torque of the output shaft in accordance with a set vehicle acceleration;
   providing a variator control having at least one stored variator ratio corresponding to the set vehicle acceleration;
   selecting the at least one stored variator ratio to align the primary pulley and secondary pulley according to the set vehicle acceleration; and
   adjusting the primary pulley and the secondary pulley to attain the corresponding stored variator ratio between the primary pulley and secondary pulley to control the acceleration of the motor vehicle.

2. The process according to claim 1, further comprising the step of determining the output torque of the output shaft by one of an interference level observer and a Kalman filter.

3. The process according to claim 2, further comprising the steps of providing a control circuit comprising the variator control, an inverse control system, and one of the interference level observer and the Kalman filter;
   inputting the engine torque as an input variable to the control circuit and obtaining a rotational speed of the secondary pulley as an output variable;
   providing the set vehicle acceleration $\alpha_{Fzg}$ as an input command variable to the control circuit and determining a ratio gradient $$\frac{div}{dt}$$

as correcting variable of the control circuit to control the acceleration of the motor vehicle.

4. The process according to claim 3, further comprising the step of calculating the ratio gradient $$\frac{div}{dt}$$

from the equation for the set vehicle acceleration $\alpha_{Fzg}$ of the output shaft;

$$\omega_2 \cdot \left(J_1 \cdot iv^2 \cdot \eta + J_2 + \frac{J_{Drive}}{i_a^2 \cdot \eta_2}\right) = M_{Mot} \cdot iv \cdot \eta - \frac{M_{Load}}{i_a \cdot \eta_2} + J_1 \cdot iv \cdot \frac{div}{dt} \cdot \omega_2 \cdot \eta$$

$$\frac{div}{dt} = \frac{M_{Mot} \cdot iv \cdot \eta - \frac{M_{Load}}{i_a \cdot \eta_2} - \left(J_1 \cdot iv^2 \cdot \eta + J_2 + \frac{J_{Drive}}{i_a^2 \cdot \eta_2}\right) \cdot \frac{\alpha_{Fzg} \cdot i_a}{r_{dyn}}}{J_1 \cdot iv \cdot \omega_2 \cdot \eta}$$

with:

$$a_{Fzg} = \frac{\omega_2}{i_a} \cdot r_{dyn}'$$

a set vehicle acceleration;
$r_{dyn}$ an effective tire radius;
$M_{Mot}$ an input torque;

$M_{Load}$ an assessed output torque or tractional resistance torque;
$\omega_2$ an angular speed of the secondary shaft;
iv a ratio of the variator;
$J_1$, $J_2$, $J_{Drive}$ an inertiae;
$i_a$ an axle ratio (constant);
$\eta$ an effectiveness input; and
$\eta_2$ an effectiveness output;
wherein the output torque or a tractional resistance torque $M_{Load}$ is assessed by the equation for the output shaft;

$$\omega_2 \cdot \left(J_1 \cdot iv^2 \cdot \eta + J_2 + \frac{J_{Drive}}{i_a^2 \cdot \eta_2}\right) = M_{Mot} \cdot iv \cdot \eta - \frac{M_{Load}}{i_a \cdot \eta_2} + J_1 \cdot iv \cdot \frac{d\,iv}{dt} \cdot \omega_2 \cdot \eta$$

wherein an interference level observation is carried out with the output torque $M_{Load}$, where $M_{Load}=0$, the variator ratio iv and the ratio gradient div/dt are entrained as time variant parameters and measuring as output variables the angular speed $\omega_2$ of the secondary shaft of the variator and using as input variable the engine torque $M_{Mot}$.

5. The process according to claim 4 Further comprising the step of filtering the acceleration of the motor vehicle via a low-pass filter so that only low-frequency components are contained in the signal.

6. The process according to claim 5, wherein the set vehicle acceleration $\alpha_{Fzg}$ during downshifts is based on a standard where $\alpha_{Fzg} \geq 0$ and the set vehicle acceleration $\alpha_{Fzg}$ during upshifts is based an the standard $\alpha_{Fzg} \leq 0$.

* * * * *